(12) United States Patent
Lipson et al.

(10) Patent No.: US 10,962,720 B2
(45) Date of Patent: Mar. 30, 2021

(54) 3D FUNNEL PHOTONIC STRUCTURE FOR FIBER TO WAVEGUIDE COUPLING

(71) Applicant: The Trustees of Columbia University in the City of New York, New York, NY (US)

(72) Inventors: Michal Lipson, New York, NY (US); Oscar Adrian Jimenez Gordillo, New York, NY (US); Aseema Mohanty, New York, NY (US)

(73) Assignee: The Trustees of Columbia University in the City of New York, New York, NY (US)

( * ) Notice: Subject to any disclaimer, the term of this patent is extended or adjusted under 35 U.S.C. 154(b) by 0 days.

(21) Appl. No.: 16/513,894

(22) Filed: Jul. 17, 2019

(65) Prior Publication Data

US 2020/0026005 A1    Jan. 23, 2020

Related U.S. Application Data

(60) Provisional application No. 62/699,479, filed on Jul. 17, 2018, provisional application No. 62/864,776, filed on Jun. 21, 2019.

(51) Int. Cl.
*G02B 6/30* (2006.01)
*G02B 6/122* (2006.01)
*G02B 6/26* (2006.01)
*G02B 6/38* (2006.01)

(52) U.S. Cl.
CPC ............ *G02B 6/30* (2013.01); *G02B 6/1228* (2013.01); *G02B 6/305* (2013.01); *G02B 6/262* (2013.01); *G02B 6/3809* (2013.01)

(58) Field of Classification Search
None
See application file for complete search history.

(56) References Cited

U.S. PATENT DOCUMENTS

| 3,923,371 | A | * | 12/1975 | Dalgleish | ............ | G02B 6/3809 |
| | | | | | | 385/58 |
| 5,359,687 | A | | 10/1994 | McFarland et al. | | |
| 5,671,316 | A | * | 9/1997 | Yuhara | ..................... | G02B 6/30 |
| | | | | | | 385/11 |
| 6,636,669 | B1 | | 10/2003 | Chin et al. | | |

(Continued)

OTHER PUBLICATIONS

Bachim et al., "Optical-fiber-to-waveguide coupling using carbon-dioxide-laser-induced long-period fiber gratings", Optics Letters, Aug. 2005, vol. 30, Issue 16, 2080-2082.

(Continued)

*Primary Examiner* — Michael Stahl
(74) *Attorney, Agent, or Firm* — BakerHostetler

(57) ABSTRACT

An optical apparatus for coupling an optical fiber to a waveguide is disclosed. The optical apparatus can comprise a funnel coupler having an orifice configured to receive an optical fiber. The funnel coupler can mechanically support the optical fiber when received in the orifice. The funnel coupler can guide the optical fiber to a coupling end of the funnel coupler and a waveguide disposed adjacent the coupling end of the funnel coupler. One or more of the funnel coupler or the waveguide can be configured to optically couple the optical fiber and the waveguide when the optical fiber is received in the orifice.

19 Claims, 15 Drawing Sheets

(56) References Cited

U.S. PATENT DOCUMENTS

| | | | | |
|---|---|---|---|---|
| 6,798,953 | B1* | 9/2004 | Cohen | G02B 6/423 |
| | | | | 257/432 |
| 7,065,272 | B2 | 6/2006 | Taillaert et al. | |
| 7,597,485 | B2* | 10/2009 | Moriarty | G02B 6/3855 |
| | | | | 385/89 |
| 8,503,841 | B2 | 8/2013 | Kopp et al. | |
| 9,322,987 | B2 | 4/2016 | Doany et al. | |
| 9,746,612 | B2 | 8/2017 | Lipson et al. | |
| 2002/0168168 | A1* | 11/2002 | Iravani | G02B 6/3636 |
| | | | | 385/136 |
| 2003/0019838 | A1* | 1/2003 | Shaw | G02B 6/30 |
| | | | | 216/20 |
| 2004/0022496 | A1* | 2/2004 | Lam | G02B 6/30 |
| | | | | 385/49 |
| 2004/0101248 | A1* | 5/2004 | Tavlykaev | G02B 6/241 |
| | | | | 385/48 |
| 2010/0092128 | A1* | 4/2010 | Okayama | G02B 6/102 |
| | | | | 385/14 |
| 2016/0047990 | A1* | 2/2016 | Zine-El-Abidine | G02B 6/30 |
| | | | | 385/37 |
| 2018/0031786 | A1* | 2/2018 | Aoki | G02B 6/4214 |
| 2018/0039027 | A1 | 2/2018 | Kato et al. | |
| 2019/0235171 | A1* | 8/2019 | Brusberg | G02B 6/02033 |

OTHER PUBLICATIONS

Barwicz et al., "Low-Cost Interfacing of Fibers to Nanophotonic Waveguides: Design for Fabrication and Assembly Tolerances", IEEE Photonics Journal, vol. 6, No. 4, 6600818 (2014).
Chandalia et al., "Adiabatic coupling in tapered air-silica microstructured optical fiber", IEEE, 2001, 13(1), 52-4.
Chen et al., "Apodized waveguide grating couplers for efficient coupling to optical fibers", IEEE Photonics Technology Letters, Aug. 2010, vol. 22, Issue 15, 1156-1158.
Chen et al., "Polarization-independent grating couplers for silicon-on-insulator nanophotonic waveguides", Opt Lett., 2011, 36(6), 796-8.
Gibbs, "Nonlinear photonic crystal nanocavities and waveguides", NSF Grant # 0501402, Apr. 15, 2005, 4 pages.
Heideman et al., "TriPleX™: The low loss passive photonics platform: Industrial applications through Multi Project Wafer runs", IEEE Photonics Conference, Oct. 2014, 224-225.
Hoffman et al., "Ultrahigh transmission optical nanofibers", AIP Advances 4, 067124 (2014).
Jimenez Gordillo et al., "3D photonic structure for plug-and-play fiber to waveguide coupling", CLEO: Science and Innovations, 2018, 2 pages.
Jimenez Gordillo et al., "Plug-and-play fiber to waveguide connector", Optical Society of America, 2019, 6 pages.
Khandokar et al., "Performance Enhanced Butt Coupling for Effective Interconnection Between Fiber and Silicon Nanowire", IEEE Journal of Quantum Electronics, vol. 52, No. 9, 8400106 (2016).
Ku et al., "Wide-Band Optical Mode Converters for Coupling Between Fibers and Silicon Photonic Wires With Large Misalignment Tolerance", Journal of Lightwave Technology, vol. 31, No. 10, pp. 1616-1620, (2013).
Kurokawa et al., "Polymer optical circuits for multimode optical fiber systems", Appl Out., 1980, 19(18), 3124-9.
Malloy, "NER: Nanophotonic devices based on direct coupling of surface Plasmons and quantum dots", NSF Grant # 0404378, Aug. 25, 2004, 2 pages.
Markov et al., "Fiber-to-chip coupler designed using an optical transformation", Optics Express, Jun. 2012, vol. 20, Issue 13, 14705-14713.
Nanotaper for Compact Mode Conversion (Almeida VR, Panepucci RR, Lipson M.), Opt. Lett. Optical Society of America; Aug. 2003 I; 28(15):1302-4.
Nguyen et al., "Silicon-based highly-efficient tiber-to-waveguide coupler for high index contrast systems", Applied Physics Letters, Feb. 2006, vol. 88, Issue 8, 081112.
Schiappelli et al., "Efficient fiber-to-waveguide coupling by a lens on the end of the optical fiber fabricated by focused ion beam milling", Microelectronic Engineering, Jun. 2004, vol. 73, 397-404.
Shoji et al., "Low loss mode size converter from 0.3(Mu)m square Si wire waveguides to singlemode fibres", Electronics Letters, vol. 38, No. 25, pp. 1669-1670, (2002).
Shu et al., "Efficient coupler between chip-level and board-level optical waveguides", Optics Letters, vol. 36, No. 18, pp. 3614-3616, (2011).
Sugita et al., "Very low insertion loss arrayed-waveguide grating with vertically tapered waveguides", IEEE Photonics Technology Letters, Sep. 2000, vol. 12, Issue 9, 1180-1182.
Taillaert et al., "A compact two-dimensional grating coupler used as a polarization splitter", IEEE Photonics Technology Letters, Sep. 2003, vol. 15, Issue 9, 1249-1251.
Taillaert et al., "An out-of-plane grating coupler for efficient butt-coupling between compact planar waveguides and single-mode fibers", IEEE Journal of Quantum Electronics, Jun. 2002, vol. 38, Issue 7, 949-955.
Taillaert et al., "Grating couplers for coupling between optical fibers and nanophotonic waveguides", Japanese Journal of Applied Physics, Aug. 2006, vol. 45, Issue 8A, 6071-6077.
Tao et al., "Improving coupling efficiency of tiber-waveguide coupling with a double-tip coupler", Optics Express, Dec. 2008, vol. 16, Issue 25, 20803-20808.
Van Thourhout et al., "Nanophotonic Devices for Optical Interconnect", IEEE, 2010, 16(5), 1363-1375.
Vernooy et al., "Alignment-Insensitive Coupling for PLC-Based Surface Mount Photonics", IEEE Photonics Letters, vol. 16, No. 1, pp. 269-271, (2004).
Vivien et al., "Design, realization, and characterization of 3-D taper for fiber/micro-waveguide coupling", IEEE Journal of Quantum Electronics, Nov. 2006, vol. 12, Issue 6, 1354-1358.
Wood et al., "Compact cantilever couplers for low-loss fiber coupling to silicon photonic integrated circuits", Optics Express, Jan. 2012, vol. 20, Issue 1, 164-172.

* cited by examiner

3D FUNNEL PHOTONIC STRUCTURE FOR FIBER TO WAVEGUIDE COUPLING

CROSS-REFERENCE TO RELATED APPLICATIONS

This application claims the benefit of U.S. Provisional Patent Application No. 62/699,479, filed Jul. 17, 2018, and claims the benefit of U.S. Provisional Patent Application No. 62/864,776, filed Jun. 21, 2019, each of which is hereby incorporated by reference in its entirety for any and all purposes.

GOVERNMENT SUPPORT CLAUSE

This invention was made with Government support under DE-AR0000720 awarded by the Advanced Research Projects Agency-Energy (ARPA-E), 2016-EP-2693-A awarded by the National Science Foundation/Semiconductor Research Corporation (NSF/SRC), and CCF-1640108 awarded by NSF Energy-Efficient Computing: from Devices to Architectures (E2CDA). The Government has certain rights in the invention.

BACKGROUND

The mass production and commercialization of integrated nanophotonic (NP) devices has been slowed down by the lack of a robust, passive, and misalignment tolerant process for packaging the coupling of light in and out of the devices. One difficulty arises from the huge mode mismatch between an optical fiber and a NP waveguide.

There are many techniques for coupling light in and out of NP waveguides, but they all suffer from tradeoffs between efficiency, bandwidth, and alignment tolerance. End-fire techniques offer large bandwidths and high efficiencies but have small alignment tolerances (~1 μm) that require expensive active alignment tools to achieve them. Grating couplers provide larger alignment tolerances, but suffer from narrow bandwidths and need complex additional fabrication steps for achieving high efficiencies.

As such, improvements are needed.

SUMMARY

Optical apparatuses and methods of making and using the same are disclosed. An optical apparatus can comprise a funnel coupler having an orifice configured to receive an optical fiber. The funnel coupler can mechanically support the optical fiber when received in the orifice. The funnel coupler can guide the optical fiber to a coupling end of the funnel coupler. The optical apparatus can comprise a waveguide disposed adjacent the coupling end of the funnel coupler. One or more of the funnel coupler or the waveguide can be configured to optically couple the optical fiber and the waveguide when the optical fiber is received in the orifice.

An optical system can comprise a funnel coupler having an orifice configured to receive an optical fiber. The funnel coupler can mechanically support the optical fiber when received in the orifice. The funnel coupler can guide the optical fiber to a coupling end of the funnel coupler. The optical system can comprise a first waveguide disposed adjacent the coupling end of the funnel coupler. One or more of the funnel coupler or the first waveguide can be configured to optically couple the optical fiber and the first waveguide when the optical fiber is received in the orifice.

The optical system can comprise a second waveguide disposed adjacent the first waveguide and optically coupled thereto.

The scope of the invention also includes a system including a processor that executes stored instructions for executing the steps of the method. The above and other characteristic features of the invention will be apparent from the following detailed description of the invention.

BRIEF DESCRIPTION OF THE DRAWINGS

The present application is further understood when read in conjunction with the appended drawings. In the drawings.

DETAILED DESCRIPTION OF ILLUSTRATIVE EMBODIMENTS

The present disclosure relates to a photonic structure (e.g., 3D photonic structure) that can be used for coupling (e.g., passively coupling, mechanically coupling, optically coupling) an optical fiber to a waveguide. The photonic structure can be configured to provide high efficiency, high bandwidth, and high alignment tolerance in comparison to conventional structures. The photonic structure can be based on a polymer or other material. The photonic structure can be configured to serve as a mechanical support of an incoming fiber. The photonic structure can be configured to operate as a waveguide for bridging between the mode of a fiber and the mode of an on-chip waveguide (e.g., on-chip high confining waveguide). The disclosed photonic structure allows for a robust highly efficient and misalignment insensitive coupling between fibers and nano-photonic waveguides.

Figure 1A:
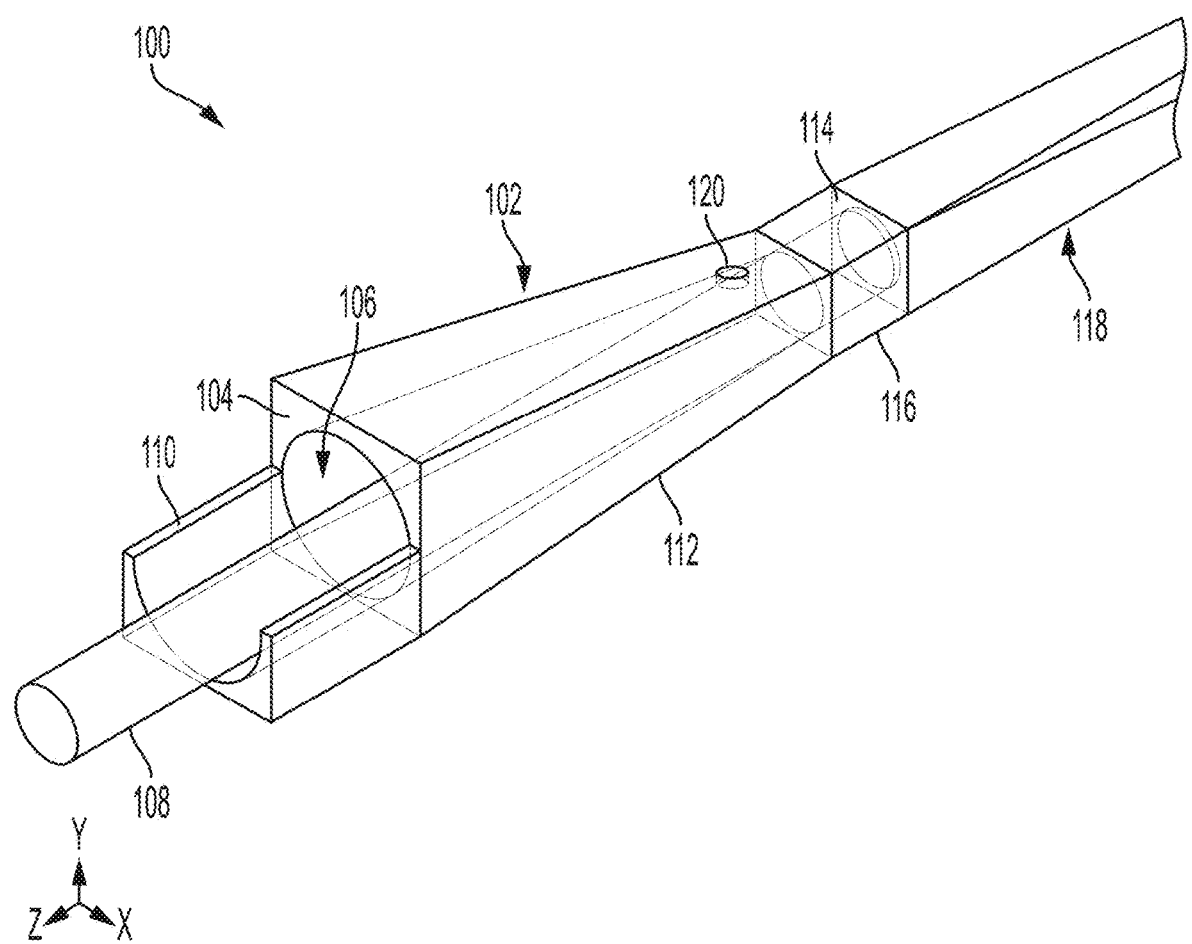
FIG. 1A illustrates a schematic perspective view of a funnel coupler with tapered fiber in place.
Figure 1B:
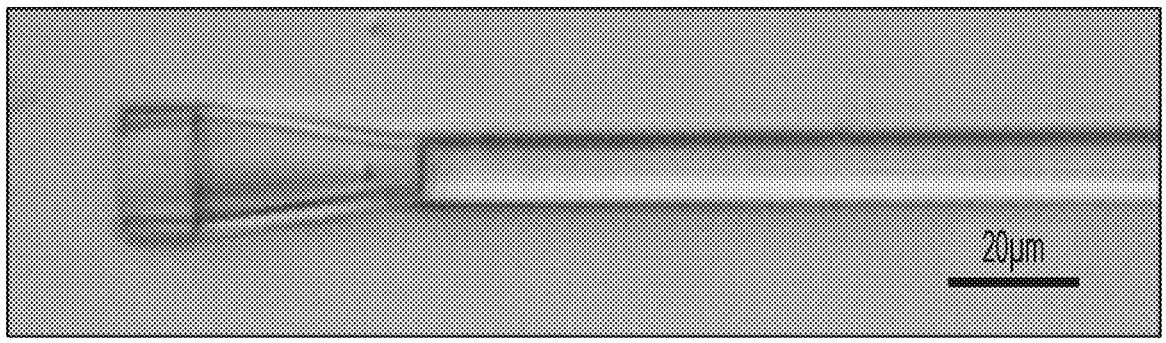
FIG. 1B illustrates a top view of an example funnel coupler.
Figure 1C:
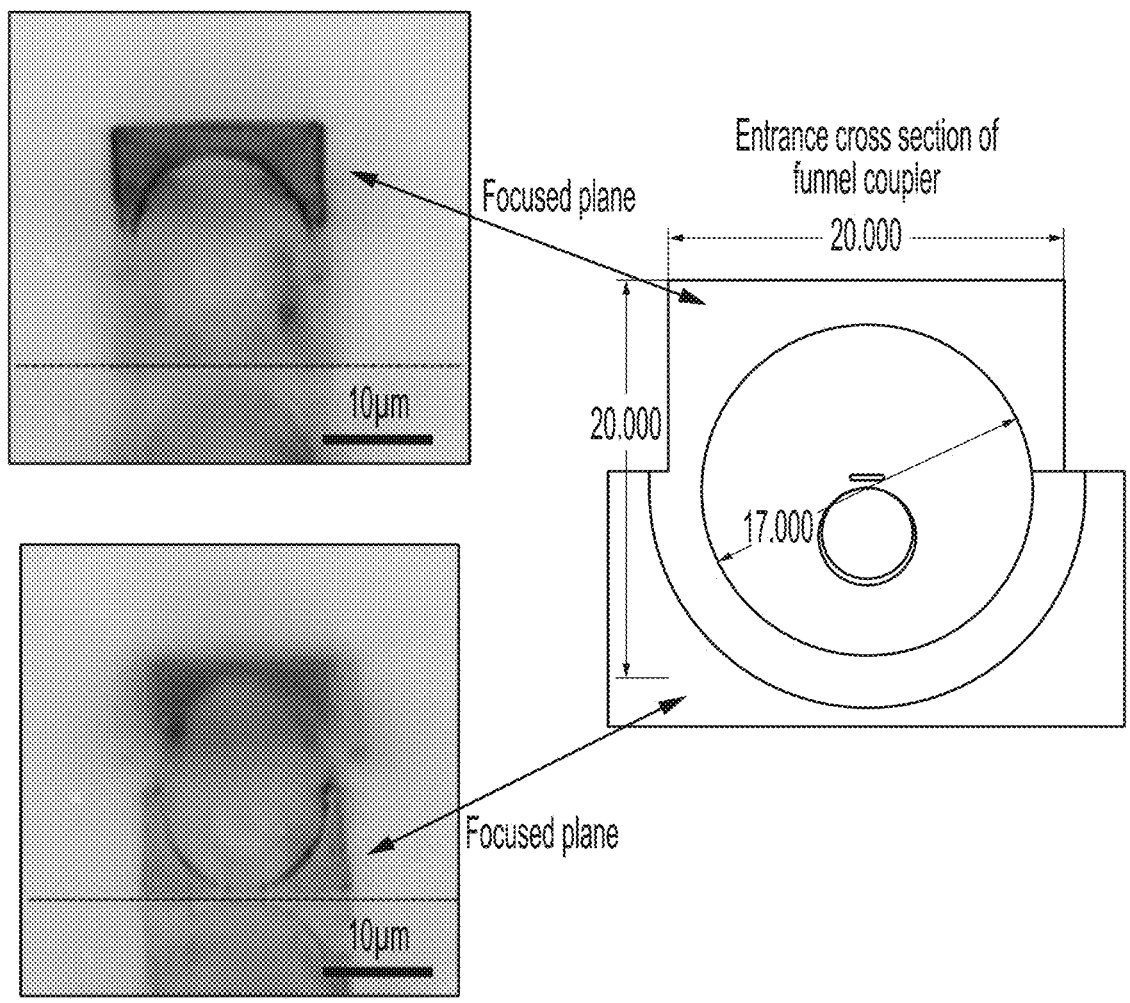
FIG. 1C illustrates example cross sectional representations of an example funnel coupler.

FIGS. 1A-C show an example apparatus 100 in accordance with the present disclosure. FIG. 1A illustrates a schematic perspective view of an example apparatus 100. The apparatus 100 can comprise a photonic structure. The apparatus 100 can comprise a funnel coupler 102 (e.g., or funnel structure). The funnel coupler 102 can comprise a three-dimensional funnel structure. The funnel coupler 102 can be configured to couple an optical fiber 108 to a waveguide 118. The funnel coupler 102 can be configured to enable mechanical routing of a fiber (e.g., tapered optical fiber) to a facet of a waveguide 118 (e.g., polymer waveguide). The funnel couple 102 can be configured to mechanically hold the optical fiber 108 in place without allowing possible misalignments between the optical fiber 108 and the waveguide 118.

The funnel coupler 102 can comprise a receiving end 104. The funnel coupler 102 (e.g., the receiving ending 104 of the funnel coupler 102) can have an orifice 106. The orifice 106 can comprise an opening in the receiving end 104. The orifice 106 can be configured to receive an optical fiber 108. The orifice 106 can have a circular shape (e.g., or any other suitable shape, such as a square, rectangle, oval).

The funnel coupler 102 can be configured mechanically support the optical fiber 106 when received in the orifice 104. The funnel coupler 102 can comprise a support member 110. The support member 110 can extend from the receiving end 104. The support member 110 can extend from a bottom half (e.g. or bottom portion) of the receiving end 104. The support member 110 can have a semi-circular shape, a V-shape, and/or other shape that conforms to the shape of the optical fiber 108. The funnel coupler 102 can comprise a first stage 112. The first stage can be configured to support at least a portion of the optical fiber 108. The first stage 112 and the support member 110 can together mechanically support the optical fiber 108.

The funnel coupler 102 can be configured to guide the optical fiber to a coupling end 114 of the funnel coupler 102. The first stage 112 can be configured to guide the optical fiber 108 to a second stage 116. The second stage 116 can have an opening that is smaller than the orifice 106. The orifice 106 can have a first diameter adjacent the coupling end 114 that is smaller than a second diameter at an end opposite (e.g., the receiving end 104) the coupling end 114. The first diameter can be in a range of about 50 μm to about 10 μm, about 30 μm to about 10 μm, about 25 μm to about 15 μm, and/or the like. The first diameter can be about 20 μm. The second diameter can be in a range of about 5 μm to about 15 μm, about 3 μm to about 15 μm, about 5 μm to about 10 μm, about 1 μm to about 20 μm, and/or the like. The second diameter can be about 5 μm, about 10 μm, and/or the like.

The funnel coupler 102 can have a tapered cross-section along a length thereof. The orifice 106 can have a tapered cross-section along a length thereof. The optical fiber 108 can be tapered along a length thereof. The funnel coupler 102 can be configured to minimally perturb the incoming optical mode by ensuring that the side walls of the funnel coupler 102 are in close proximity to the optical fiber 108 for very short distances along the funnel coupler 102.

The apparatus 104 can comprise a waveguide 118. The waveguide 118 can be formed from a polymeric material. The waveguide 118 can be tapered along a length thereof (The tapering can be linear, along the length of the waveguide 118 but can also be non-linear along the length of the waveguide.) The waveguide 118 can be disposed adjacent the coupling end 114 of the funnel coupler 102. One or more of the funnel coupler 102 or the waveguide 118 can be configured to optically couple the optical fiber 108 and the waveguide 118 when the optical fiber 108 is received in the orifice 106.

One or more of the funnel coupler 102 or the waveguide 118 can be configured to optically butt couple the optical fiber 108 and the waveguide 102 when the optical fiber 108 is received in the orifice 106. At an interface between the optical fiber 108 and the waveguide 118 (e.g., at the end of the funnel coupler 102), the optical fiber 108 and the waveguide 118 can be butt coupled, mode matched, aligned, and/or the like (e.g., by the funnel coupler 102). The first stage 118 can guide the optical fiber 108 to be inserted into the second stage 116. The inner opening (e.g., inner diameter, inner channel) of the second stage 116 can be within a threshold size of the optical fiber 108 such that the optical fiber 108 becomes removably (e.g., mechanically coupled) fixed in position upon being inserted into the second stage 116. In some implementations, the first stage 112 and the second stage 116 can be combined as a single stage.

The funnel coupler 102 can comprise a top opening 120. The top opening 120 can be used as part of fabrication of the apparatus 100. The top opening 120 can be configured to allow the flow of resist developer inside the funnel coupler 102 during fabrication.

Figure 3:
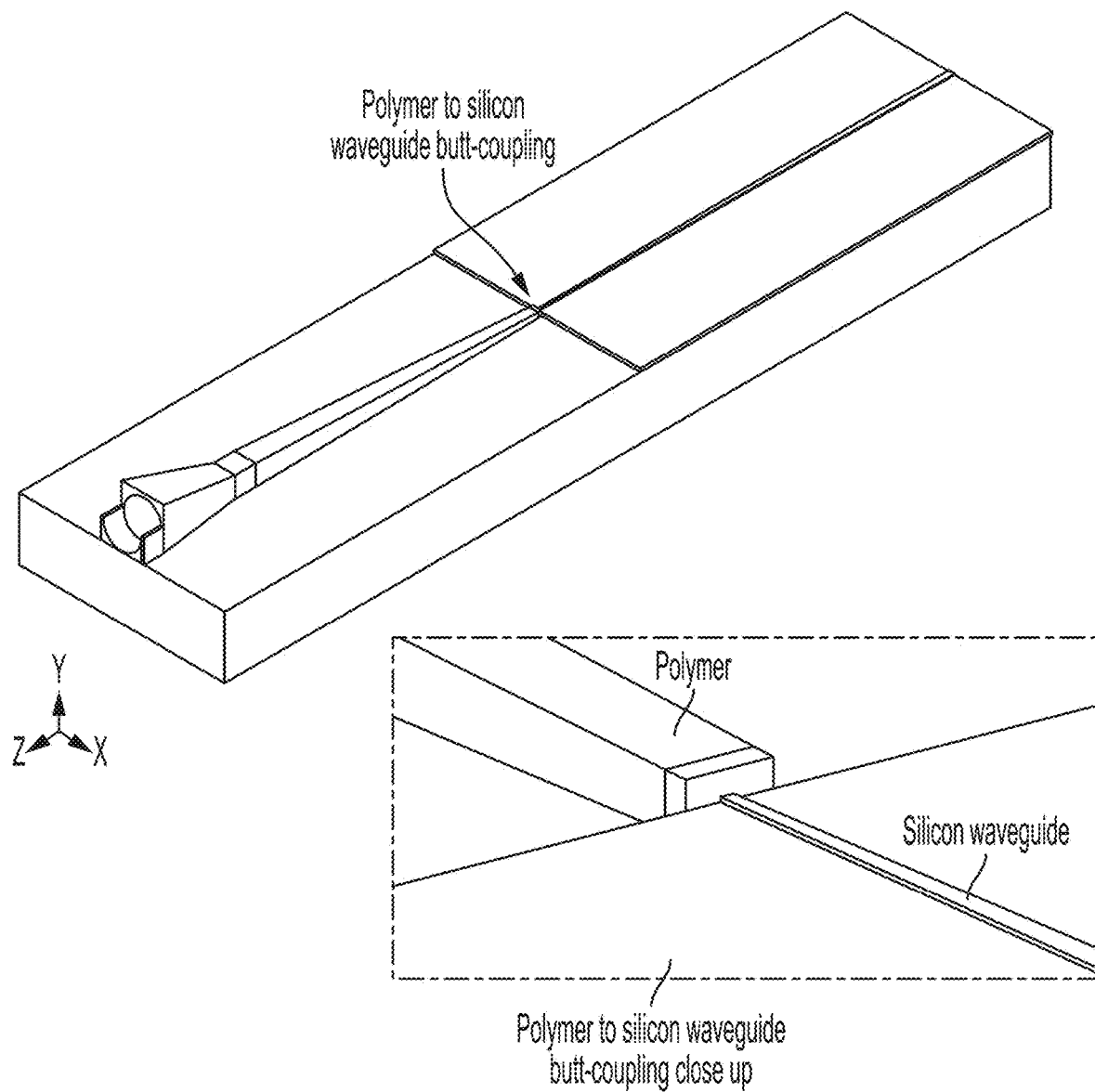
FIG. 3 illustrates a schematic representation of an optical apparatus, where in a butt coupling approach the end of the polymer waveguide is centered to the inverse taper input of the on-chip silicon waveguide.
Figure 4:
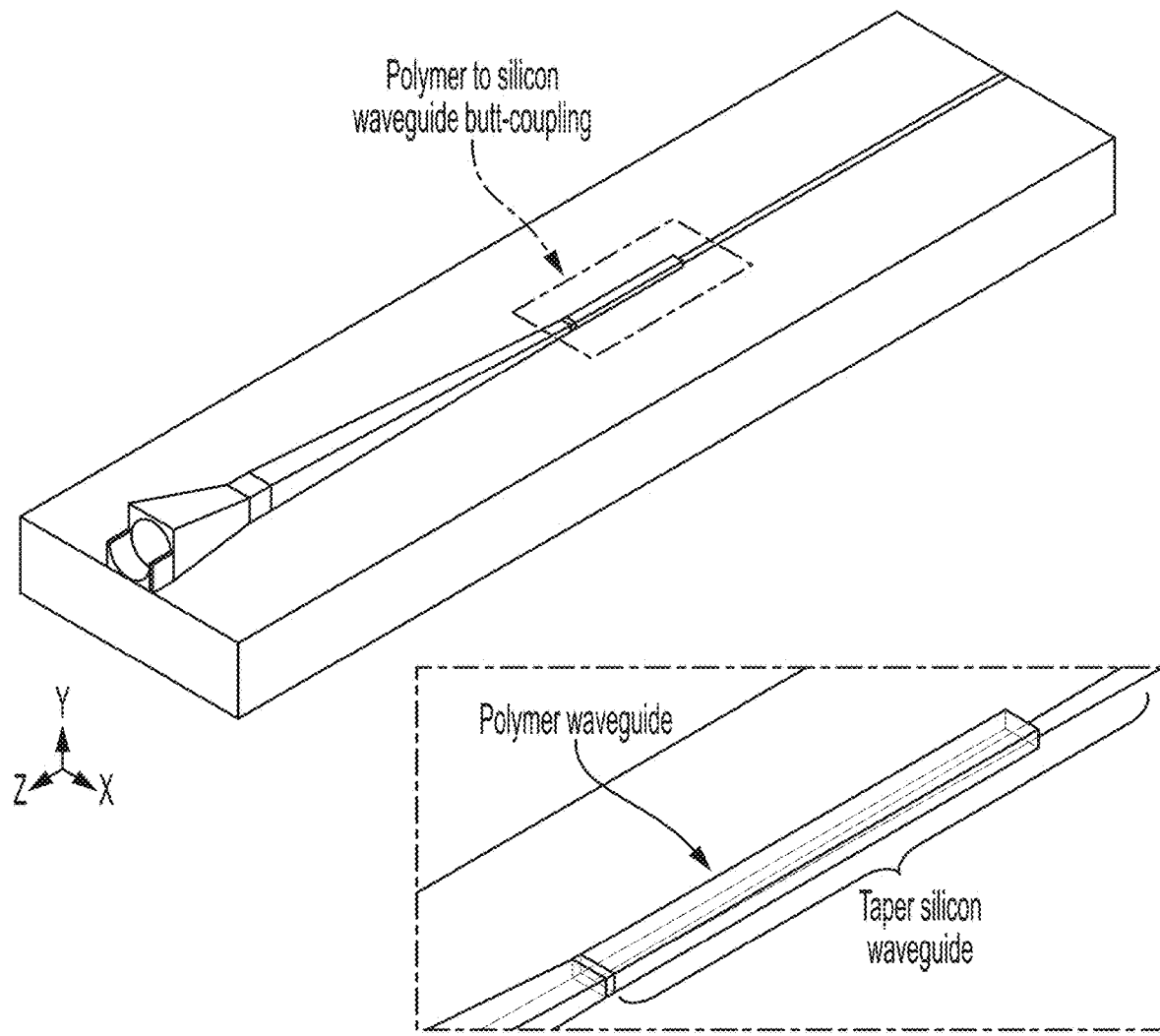
FIG. 4 illustrates a schematic representation of an optical apparatus, where an adiabatic approach includes placing the polymer waveguide directly on top of a tapered on-chip high confinement silicon waveguide.
Figure 5:
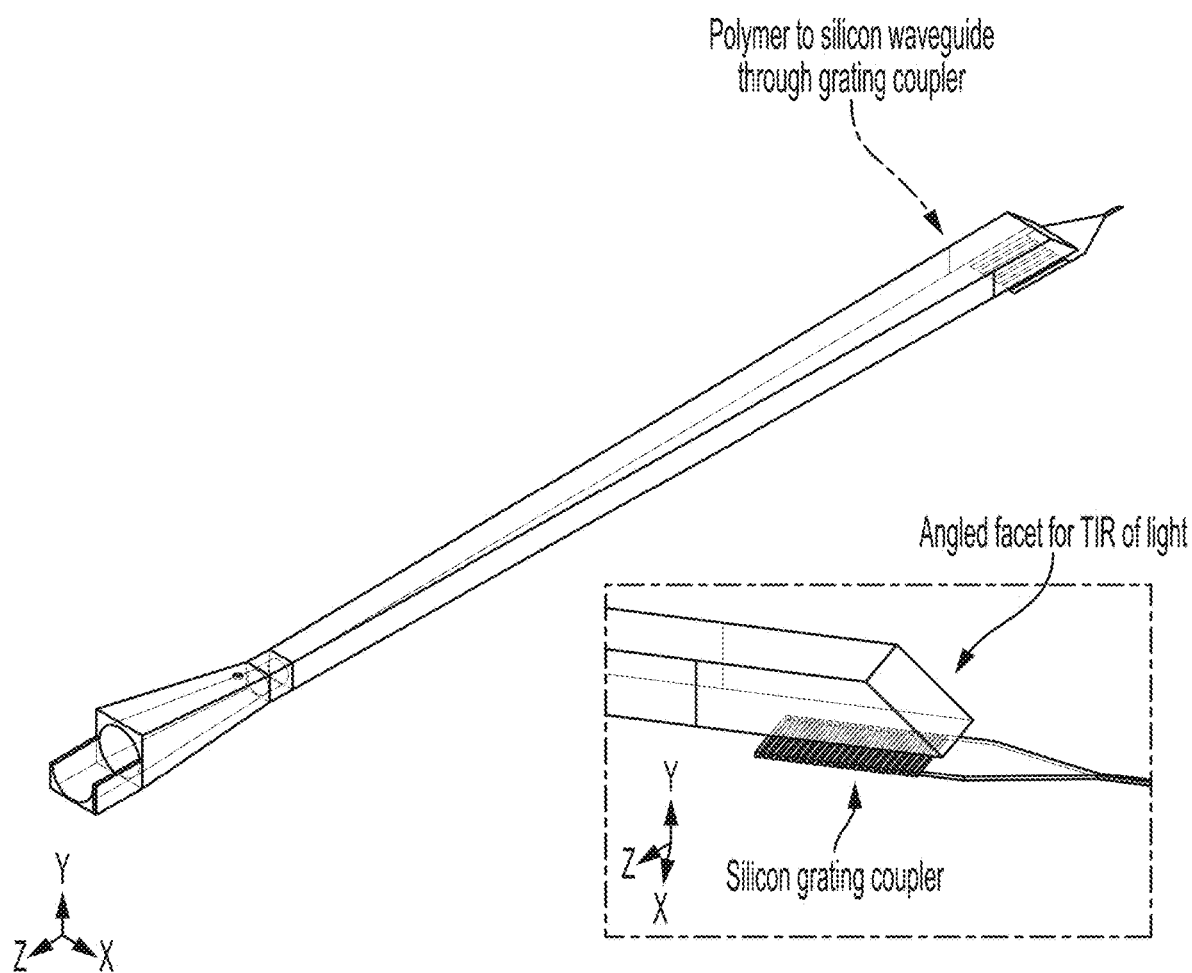
FIG. 5 illustrates a schematic representation of an optical apparatus, where a grating coupler approach includes defining a total internal reflection (TIR) mirror at the end of the polymer waveguide designed with the right angle to couple light in and out of the silicon grating.

The apparatus 100 can further comprise a waveguide stage coupling together the waveguide 118 with an additional waveguide (e.g., as shown in FIGS. 3-5). The waveguide 118 can have a tapering portion. The tapering portion can taper inward as the waveguide extends in a direction away from the funnel coupler 102. The tapering portion can have adiabatic tapering to smaller dimensions for adiabatic coupling of light to an additional waveguide. The additional waveguide can comprise a waveguide disposed at least partially below the waveguide 118. The additional waveguide can comprise a laterally tapered waveguide. The waveguide 118 can comprise a different material than the additional waveguide. The waveguide 118 can comprise a polymer material. The additional waveguide can comprise a silicon material.

FIG. 1B illustrates a schematic top view of the funnel coupler of FIG. 1A. FIG. 1C illustrates example cross sectional representations of the funnel coupler of FIG. 1A. It should be understood that the dimensions shown are example dimensions and other dimensions may be used as appropriate to meet design needs. Any of the dimensions described herein should be understood as exemplary dimensions that may be varied according to design needs.

Figure 2A:
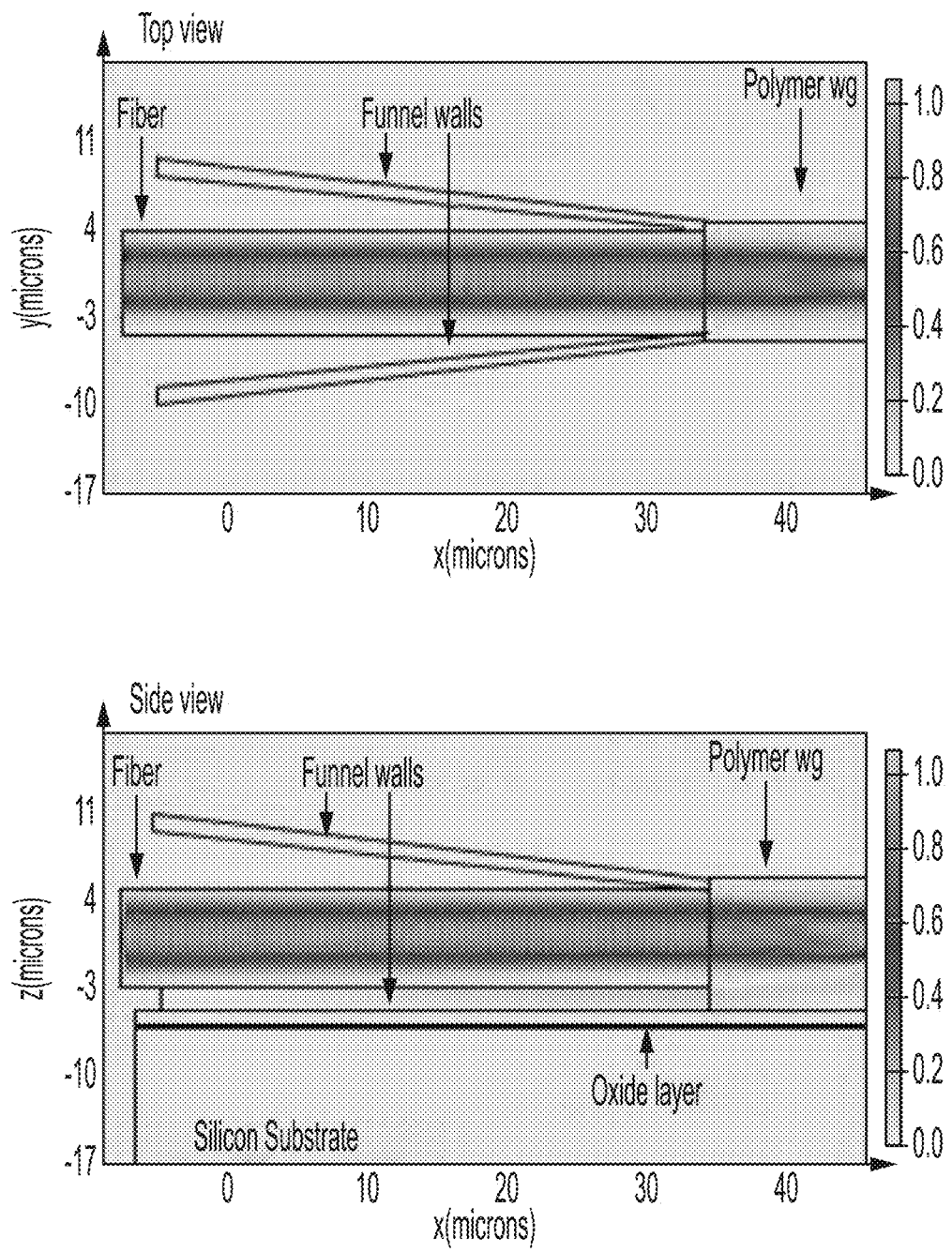
FIG. 2A illustrates a plot of the electric field intensity profile obtained by finite-difference time-domain (FDTD) simulations of the funnel coupler with the fiber in place.
Figure 2B:
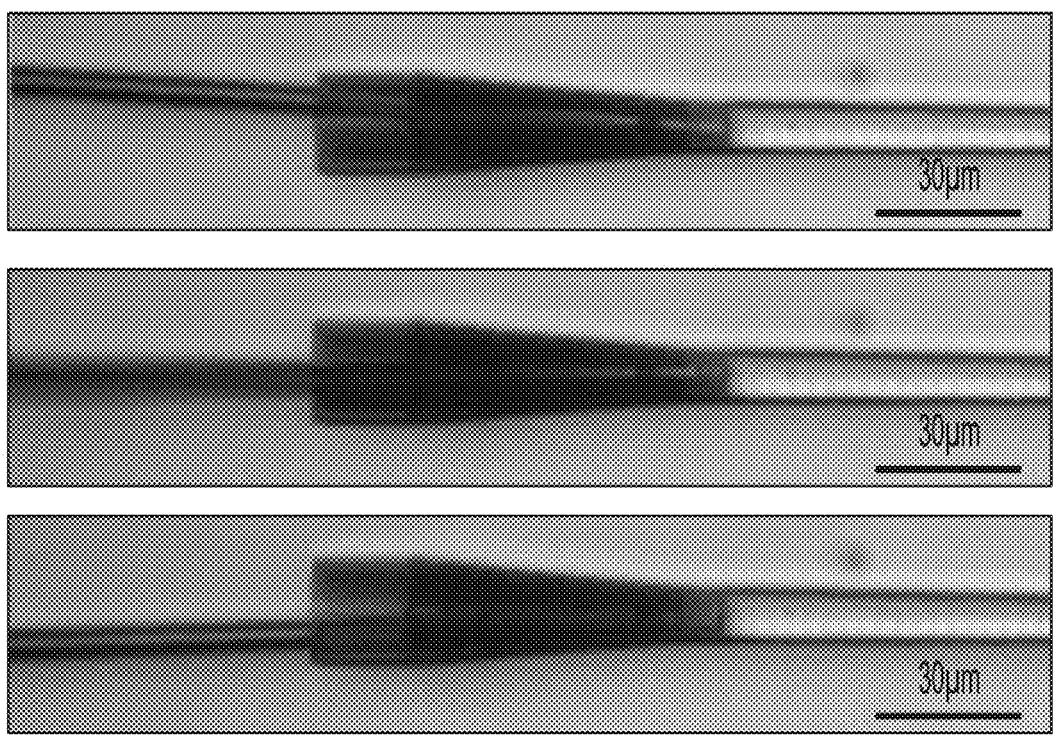
FIG. 2B illustrates optical microscopy of different alignments of the fiber inside the funnel coupler.
Figure 2C:
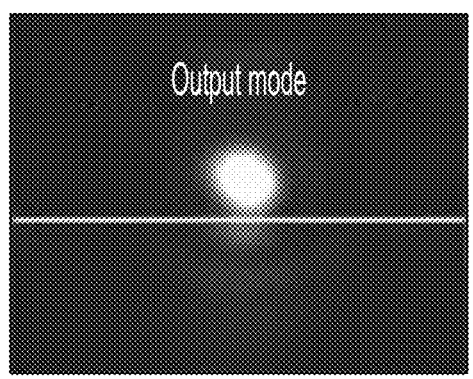
FIG. 2C illustrates an image of the mode at the output of the 4×2 microns polymer waveguide.

FIG. 2A-2C illustrate an example funnel coupler. FIG. 2A illustrates a plot of an electric field intensity profile obtained by finite-difference time-domain (FDTD) simulations of the funnel coupler with the fiber in place. As an example, light couples from the fiber into the polymer waveguide with minimal interaction with the funnel walls. The intensity near the center of the fiber and waveguide is above 0.8. Moving from the center of the fiber and waveguide radially outward, the intensity decreases to the 0.6 to 0.8 range, followed by the 0.4 to 0.6 range. At the outer edge of the fiber and waveguide, the intensity is below 0.4.

FIG. 2B illustrates optical microscopy of different alignments of the fiber inside the funnel coupler. As an example, the funnel coupler self-aligns any misaligned entrance position of the fiber. This way any possible misalignment will always exhibit the same maximum coupling efficiency. FIG. 2C illustrates an image of the mode at the output of the 4×2 microns polymer waveguide.

The funnel coupler can be configured for a slightly tapered fiber (e.g., achieved by a traveling flame tapering system) to ensure mechanical stability while minimizing the length of the coupler (e.g., which can be governed by the length of the taper that bridges the fiber mode and the waveguide mode).

The example funnel coupler was formed using 3D direct-laser-writing. The 3D direct-laser-writing was based on two photon polymerization of a photoresist. The nanoscribe Photonic Professional 3D lithography system with Nanoscribe IP Dip as photoresist can be used. The polymer couplers were written directly on top of a 4 µm thick oxide layer thermally grown on a silicon wafer. SMF28 fibers were tapered with a fiber pulling station based on a traveling flame heater and motors. The fibers were tapered down on one end to an 8.5 µm diameter.

Methods of Making

Funnel couplers as disclosed herein can be formed using 3D direct-laser-writing. The 3D direct-laser-writing can be based on two photon polymerization of a photoresist. The funnel coupler can comprise and/or be fabricated using a polymer. The disclosed apparatuses allow for coupling into on-chip high confinement silicon waveguides through different techniques, such as butt coupling (e.g., as shown in FIG. 3), adiabatic coupling (as shown in FIG. 4), and grating coupling (e.g., as shown in FIG. 5).

An example butt coupling approach can comprise directly facing a center of a polymer waveguide facet with the center of a silicon waveguide facet. The centering of the horizontal axis can be lithographically defined. The centering of the vertical axis can be based on the etching of a step on the silicon photonics chip oxide cladding layer at the silicon waveguide tip. The etched step height can be half of the polymer waveguide thickness to guarantee the vertical axis centering of the two waveguides. This way the perfect centered alignment of the two waveguides is guaranteed.

An example adiabatic approach can comprise defining the polymer waveguide directly on top of a tapered region of a silicon waveguide. The silicon waveguide can be completely air clad or cladded with a very thin layer of cladding and the tapering profile is designed to ensure complete transfer of light between the structures. The minimum length of the polymer waveguide covering the silicon waveguide is also given by the length needed to ensure complete transfer of light between them. The funnel can be defined after the end of the silicon waveguide.

An example grating coupling approach can be based on reflecting light in and out of the grating coupler by means of a total internal reflection (TIR) mirror at the end of a polymer waveguide. The grating coupler can route the light to a silicon waveguide. There can be oxide cladding between a silicon layer and the polymer waveguide. Gratings couplers can be designed to emit and capture light at certain angle with respect to the silicon waveguide, the TIR polymer mirror can be configured to reflect the light at the grating design angle in and out of the polymer waveguide.

Measurements show the potential of this funnel coupler to address the current limitations on interfacing NP devices with optical fibers without the need of high resolution active alignment tools.

Additional information and example embodiments are described as follows.

An example apparatus as disclosed herein can be used as a "plug-and-play" connector between an optical fiber and a nanophotonic waveguide. The connector, or funnel coupler, can comprise a 3D polymer structure with a fiber entrance port that simultaneously achieves mechanical and optical passive alignment with tolerance beyond 10 µm to the fiber input position. Mechanical and optical co-design is used. The funnel coupler can be fabricated using 3D nanoprinting directly on foundry fabricated diffraction grating couplers. Measurements of the example fabricated apparatus show an average of only 0.05 dB excess coupling loss between a single mode fiber and a high confinement silicon waveguide in addition to the inherent grating coupler loss. The coupling platform disclosed herein offers a passive plug-and-play solution for scalable integrated photonics fiber-chip packaging.

Photonics packaging is currently based on active alignment and on manual assembly, expensive and slow processes that hinder the scalability and viability for mass production. There is a need for passive and pluggable solutions for interfacing fibers with integrated photonic waveguides (IPWs), solutions that are compatible with standard fabrication techniques, and that can be implemented with standard automated assembly tools (AST), thus lowering the packaging costs. Different coupling techniques and materials have been used with the goal to achieve both low insertion losses and high alignment tolerances with limited success. For example, a combination of adiabatic coupling with edge-coupling using polymer waveguides can achieve down to 1 dB of optical loss between fibers and IPWs with passive alignment. Fibers with angle-polished end facets can also be used to achieve low optical loss between horizontally laid fibers and grating couplers. While these two approaches show good alignment tolerances of 2.5 µm and reasonable losses of about 1 dB, they require either a lot of on-chip footprint (the former with 1 mm long tapered waveguides) or active alignment (the latter). The challenge remains: to simultaneously address both the mechanical and optical tolerance requirements for truly passive fiber to chip alignment.

Figure 6A:
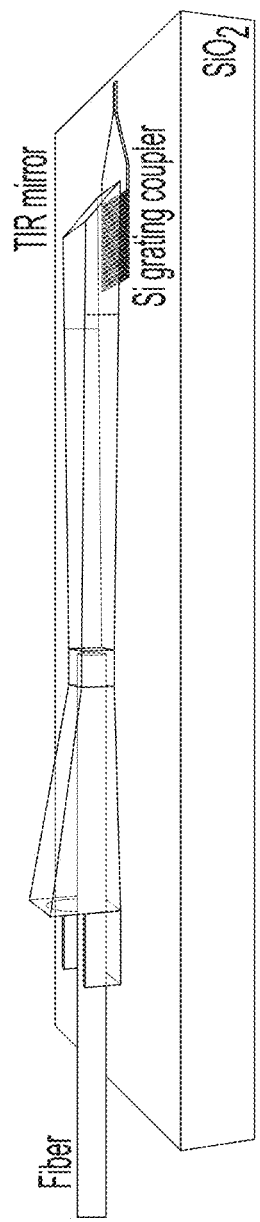
FIG. 6A illustrates a schematic perspective view of another example optical apparatus using a grating coupler approach.

FIG. 6A shows a schematic diagram of an example 3D funnel coupler fabricated on top of a grating coupler. The fiber can be inserted all the way into the funnel and edge-coupled to the polymer waveguide. The funnel coupler can be configured as a "plug-and-play" connector between a fiber and a nanophotonic waveguide. The funnel coupler can comprise a 3D polymer structure with a fiber entrance port that simultaneously achieves mechanical and optical coupling. The funnel coupler can enable fiber-waveguide passive alignment within the placement accuracy of standard AST (e.g., 10 µm). The funnel coupler can be based on a mechanical and optical co-design, analogous to commercial fiber-to-fiber connectors, which is fabricated using a commercial 3D polymer lithographic process. The structure can be based on a polymer with refractive index n1.53 and can be defined directly on top of photonic chips in a single fabrication step (e.g., as shown in FIG. 6A). The funnel coupler can be composed of a fiber entrance port followed by an acceptance funnel that terminates at a polymer waveguide facet.

Figure 6B:
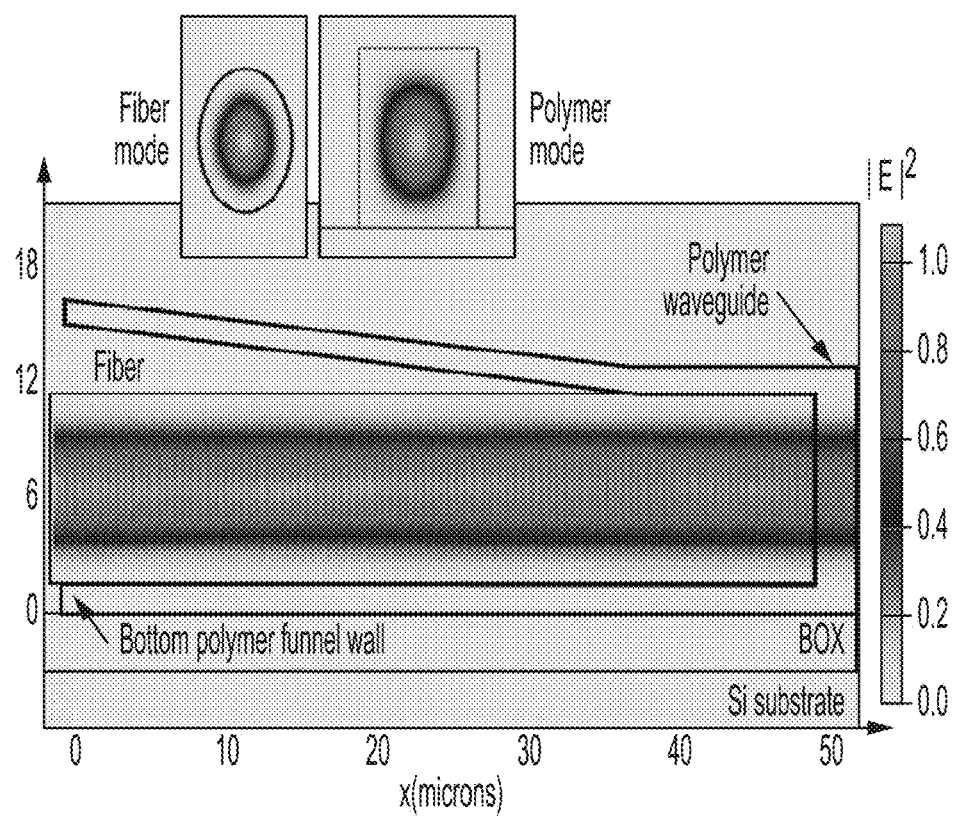
FIG. 6B illustrates a simulation of a funnel lateral cross-section where the light input is from the left.

FIG. 6B shows a FDTD simulation of the funnel lateral cross-section where the light input is from the left. The fiber and polymer waveguide mode cross-sections are shown in the insets; these two modes are spatially matched at the edge-coupling region. We can also observe that there is no light leakage into the funnel walls in direct contact with the fiber. The intensity near the center of the fiber and waveguide is above 0.8. Moving from the center of the fiber and waveguide radially outward, the intensity decreases to the 0.6 to 0.8 range, followed by the 0.4 to 0.6 range. At the outer edge of the fiber and waveguide, the intensity is below 0.4.

Figure 6C:
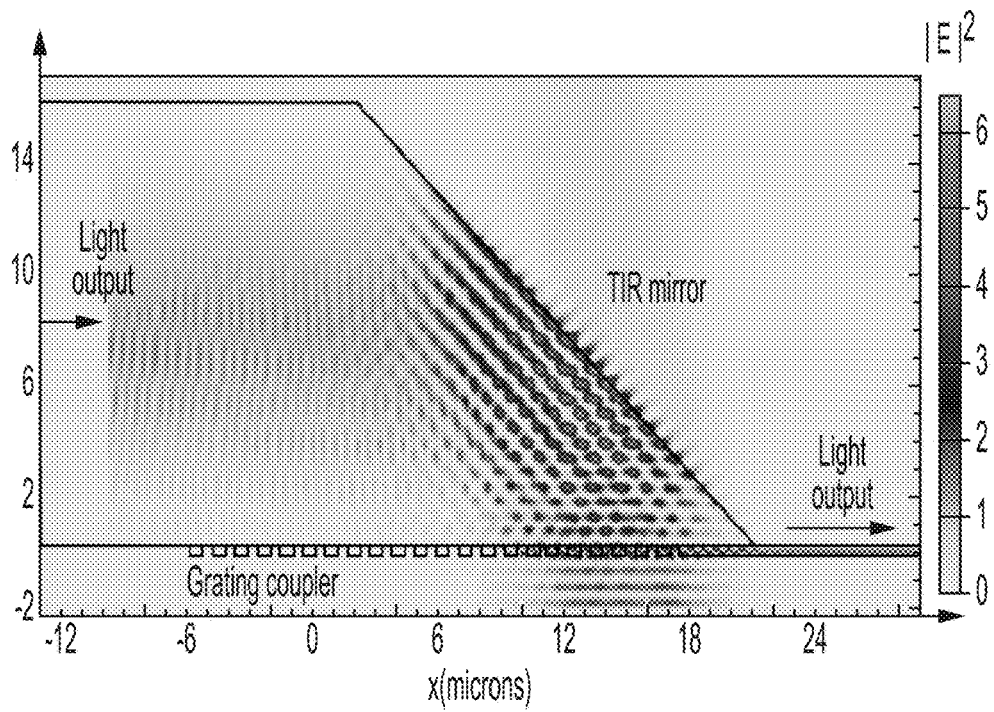
FIG. 6C illustrates a simulation of a TIR mirror reflecting light between the polymer waveguide and the grating coupler.

FIG. 6C shows an FDTD simulation of the TIR mirror reflecting light between the polymer waveguide and the grating coupler. The polymer waveguide can be designed to be mode-matched with the fiber (e.g., as explained more herein). The funnel walls can be designed to minimize light leakage by making sure the interaction length with the fiber is short enough (e.g., as shown in FIG. 6B). Following the guiding by the polymer waveguide, light can be coupled to a silicon waveguide via a grating coupler using a total internal reflection (TIR) mirror defined at the end facet of the polymer waveguide during the same fabrication step as the funnel. The TIR mirror can take advantage of the angled facet and of the refractive index contrast between the polymer and air to redirect light into the grating coupler at the grating's diffraction angle (e.g., as shown in FIG. 6C). The acceptance funnel can operate as a passive mechanical routing and support structure that directs the fiber into an optically-aligned position for edge-coupling with the polymer waveguide (e.g., as shown in FIG. 6A). The fiber can be routed into the funnel independently of the fiber's exact position relative to the center of the funnel, enabling extremely wide alignment tolerance. When fully inserted, the fiber tip (e.g., which can be thinned down to 10 μm diameter on one end) can be tightly held at the smaller end of the funnel, ensuring mechanical stability and maximum optical coupling.

2. Fabrication

A funnel coupler can be fabricated in a single step using 3D nanoprinting directly on the previously fabricated diffraction grating couplers. This fabrication technique can be based on the two photon polymerization of a photoresist. The Photonic Professional 3D lithography system (e.g., Nanoscribe GmbH) can be used. The fabrication can begin by drop-casting the photoresist (e.g., IP-Dip negative photoresist, Nanoscribe GmbH) on top of a photonics circuit chip as received from the foundry. The photonic circuit can comprise (e.g., or consists of) two TE grating couplers joined by 200 μm of a side cladded silicon waveguide from a standard multi project wafer (MPW) run from imec (e.g., basic fiber coupler TE [FC]). After an initial alignment step, the couplers can be directly fabricated (e.g., written) on top of the silicon grating couplers.

Figure 7A:
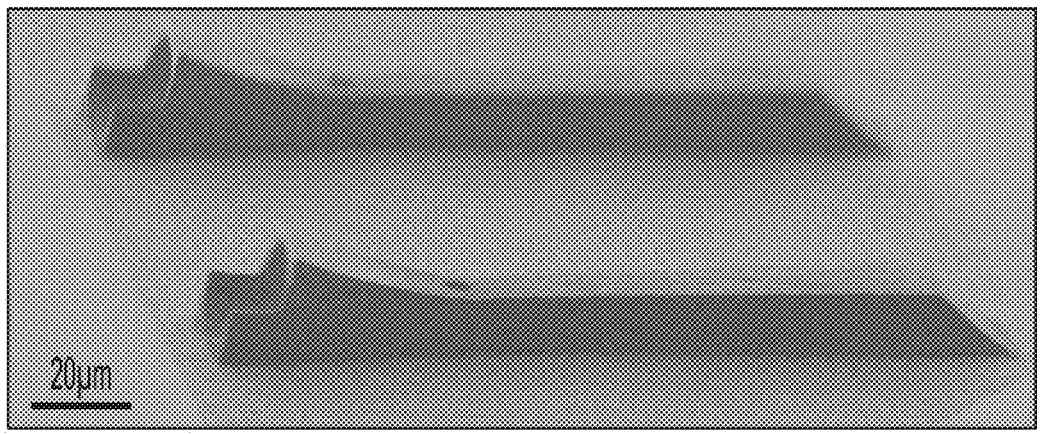
FIG. 7A illustrates a perspective view of a Scanning Electron Microscopy (SEM) images of fabricated funnel couplers.
Figure 7B:
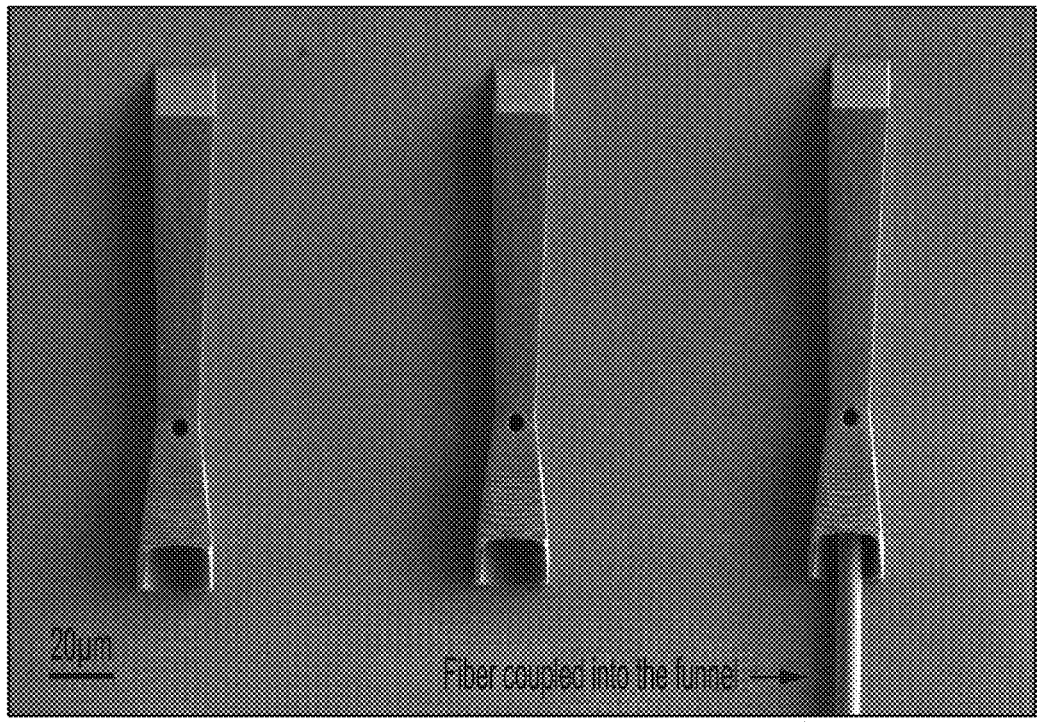
FIG. 7B illustrates a top-down view of a SEM image of fabricated funnel couplers.

FIG. 7A-B shows Scanning Electron Microscopy (SEM) images of fabricated funnel couplers showing perspective and top views. In FIGS. 7A-B, the fabricated couplers have funnel apertures that taper from a 20 μm diameter at the input down to a 10 μm diameter at the junction with the polymer waveguide. Each funnel coupler can be written in about 3 minutes. Write time can be reduced by optimizing the tool's laser scanning speed and exposure parameters. The small orifice on top of the funnel coupler (e.g., the smaller circular opening shown on the top side of both apparatuses) can be configured to allow the free flow of resist developer inside the funnel during fabrication (e.g., and has no influence on the optical properties of the device). The small dimensions (e.g., 23 μm×23 μm×160 μm, as described herein and shown in FIG. 9) of the couplers allow for high density optical I/O arrays with pitches as small as 30 μm. The single side thinned fiber can be formed with our in-house software-controlled fiber pulling station based on the heat and pull method. This type of fiber can also be obtained commercially from companies that offer standard precision glass forming. Note that the platform is designed to be robust to variations in the fiber mode field diameter (e.g., as explained further herein). After thinning the fiber along 1 cm down to approximately 10 μm in diameter, the fiber can be cleaved with a ruby scribe to obtain two thin fibers with the desired 10 μm tip diameter to fit into the funnel coupler.

3. Results

Figure 8A:
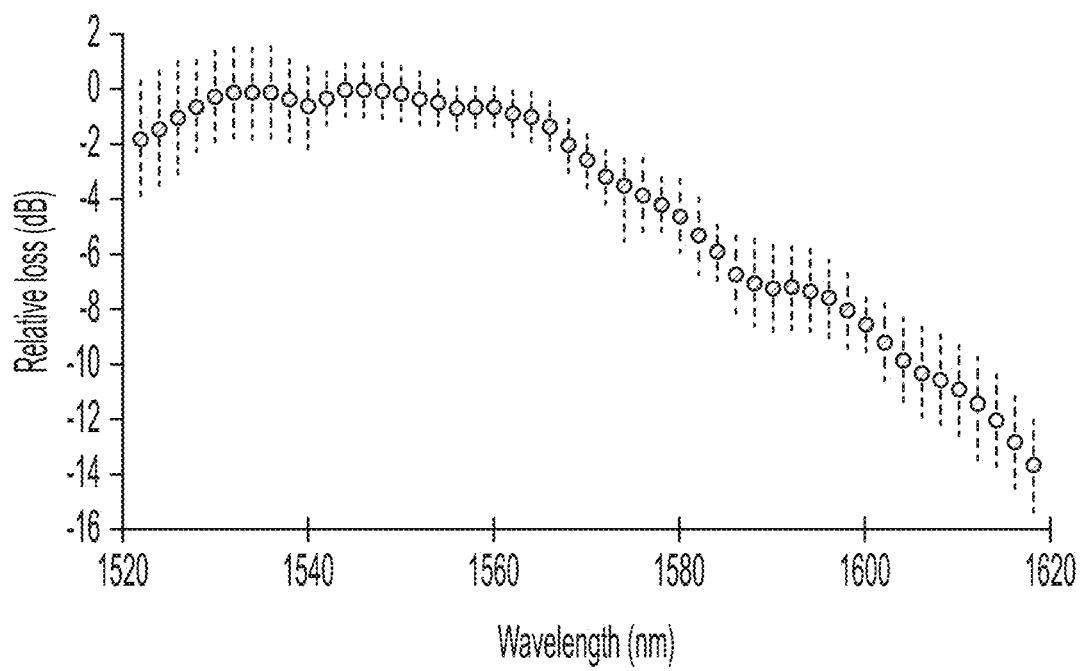
FIG. 8A is a graph illustrating averaged funnel coupler loss for 18 devices relative to the measured grating coupler loss.

Measurements of the disclosed example device show an average of only 0.05 dB of excess loss induced by the funnel coupler between a standard single mode fiber and a high confinement silicon waveguide in addition to the inherent grating coupler loss. To measure the excess loss, a first measurement was made of the coupling loss between standard cleaved single mode fibers and bare grating couplers as received from the foundry. A measurement was made of the set of 11 grating coupler pairs. The measurement indicated an average loss of −4.7 dB per grating coupler at the peak wavelength of 1582 nm. This measurement was done by launching TE polarized light through the input fiber and optimizing the alignment of input and output fibers (at a 10 off-vertical angle from the grating coupler) using high-resolution 3D alignment stages (Thorlabs MAX312D). A characterization was performed of polymer coupler by fabricating the plug-and-play coupler on top of one of the gratings of our photonic circuit. Once the polymer couplers are fabricated, a low-resolution translation stage was used to manually insert the thinned fiber into the funnel, using a live microscope image of the chip with a magnification of 10×. Each polymer coupler-grating coupler pair can be characterized by sweeping the input wavelength (at TE polarization) over a range of 100 nm in the C-band, while recording the output power spectrum. FIG. 8A shows averaged plug-and-play coupler loss for 18 devices relative to the measured grating coupler loss. The dashed lines represent the standard deviation. The averaged coupling loss for the 18 plug-and-play couplers is shown in different wavelengths in the C-band, normalized to the measured bare grating coupler peak loss of −4.7 dB.

Figure 8B:
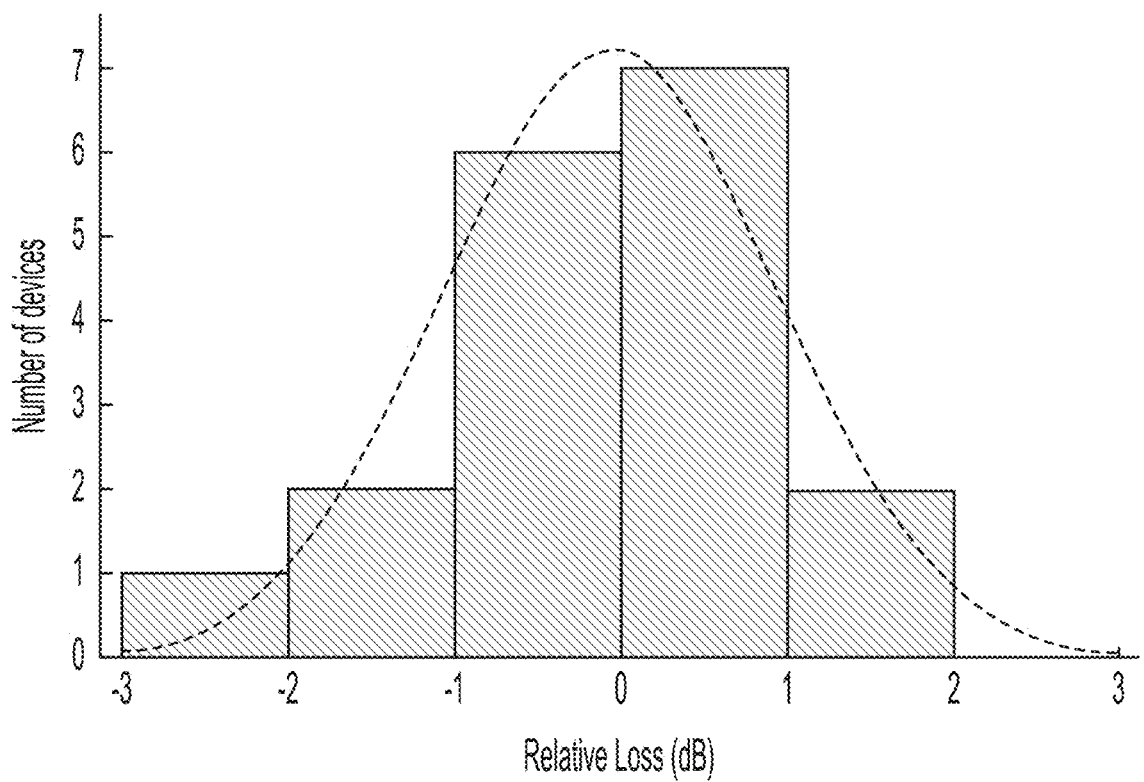
FIG. 8B is a histogram showing the distributions of the loss among the different devices with a dashed line representing a normal distribution.

FIG. 8B shows a histogram of the relative loss distribution of the 18 couplers. The dashed line is a guide to the eye that represents a normal distribution. These loss variations are mainly due to the fabrication misalignment between the couplers and the gratings. Values above 0 dB mean that the coupling efficiency between the grating-polymer waveguide-thinned fiber was higher than the measured grating-vertical fiber coupling efficiency. The losses shown are measured at the wavelength of 1544 nm, for which loss is minimum. The measurements are done with a wide variety of fiber input positions within the 20 μm diameter funnel entrance, which is within the AST placement accuracy. No excess loss from misalignment of the fiber at the coupler's input was measured. This is because the funnel always ensures the guiding of the fiber into perfect alignment (e.g., or within a threshold tolerance) with the polymer waveguide. It should be noted that the observed variations in efficiency in FIG. 8B arise mainly from misalignments between the grating and the polymer due to the tool's manual alignment process. This effect can be mitigated by automating the alignment process using computer vision algorithms to increase the accuracy and precision of the tool.

Figure 8C:
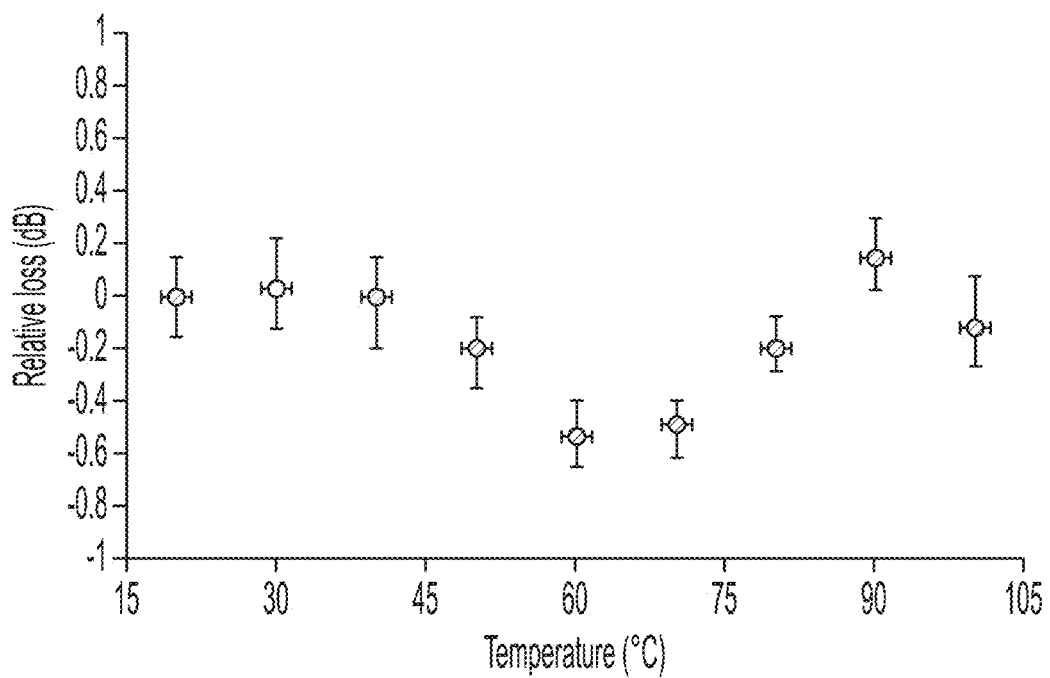
FIG. 8C is a graph illustrating measured relative loss as a function of temperature at a wavelength of 1544 nm.
Figure 8D:
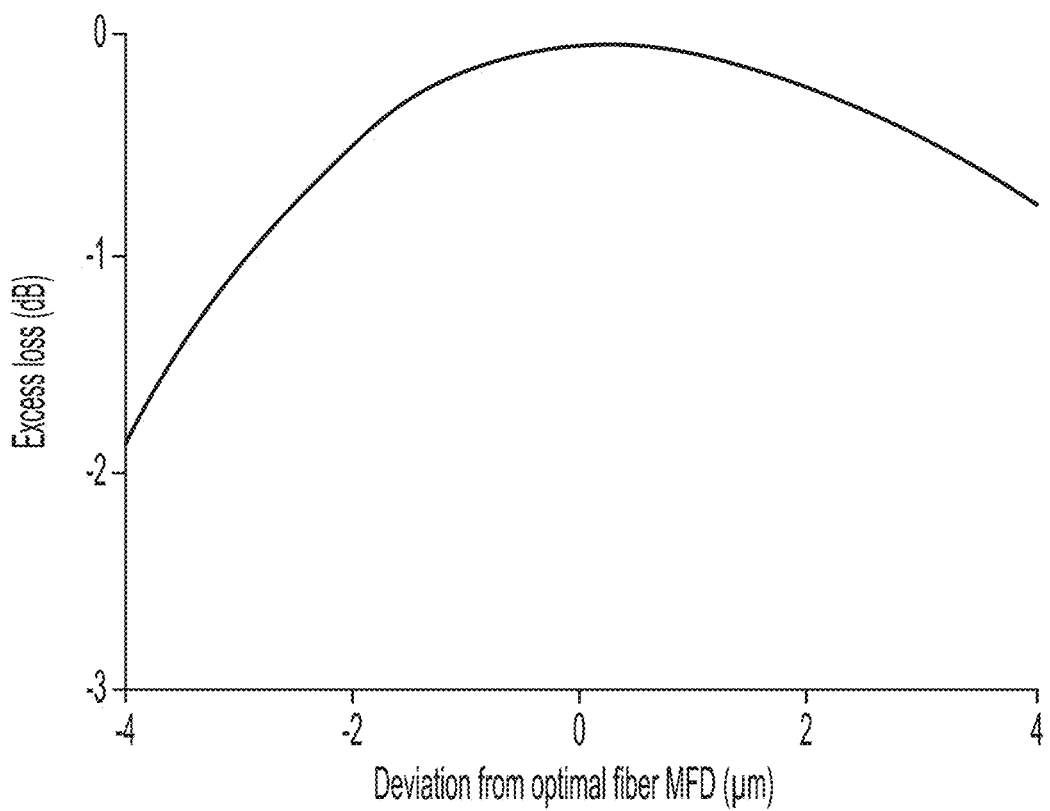
FIG. 8D is a graph illustrating simulated excess coupling loss between the polymer waveguide and the fiber with varying fiber's MFD.

FIG. 8C shows measured relative loss as a function of temperature at a wavelength of 1544 nm. FIG. 8D shows simulated excess coupling loss between the polymer waveguide and the fiber with varying fiber's MFD. The efficiency of the disclosed funnel coupler approach is robust to fiber mode field diameter (MFD) variations up to 2 μm and to temperature variations between 20° C. and 100° C. To investigate the effect on the coupling efficiency due to possible fiber MFD variations that induce mismatch between the fiber and the polymer waveguide, the coupling for different fiber MFD deviations from the optimal value (10 μm) was simulated. FIG. 8D shows that the toll on the coupling efficiency is less than 1 dB for the thinned fiber with MFD deviations of 2 μm from the nominal value. Moreover, the edge coupling between the fiber and the polymer waveguide is highly efficient over a large bandwidth for both TE and TM polarizations; the choice of grating coupler used for this example can determine the polarization dependence of the whole coupler.

To verify the robustness to temperature variations, the chip's temperature was varied from 20° C. to 100° C. and loss variations within 0.6 dB for the whole temperature range were observed, as shown in FIG. 8C (e.g., note that commercial silicon photonics transceivers have a maximum operation temperature of 70° C.). The disclosed coupling platform offers a passive plug-and-play solution for scalable integrated photonics fiber-chip packaging. The disclosed 3D funnel couplers are compatible with the placement accuracy of high-throughput microelectronic assembly tools. The platform relies on one simple post-process step that does not require a cleanroom environment and can be done at the wafer level. The disclosed approach enables in-plane coupling via gratings, eliminating the challenge of integrating fibers coupled to gratings using the traditional off-plane assembly. The passive plug and play solution disclosed for packaging chips helps enable automatically packaged and mass produced integrated photonic devices.

Figure 9:
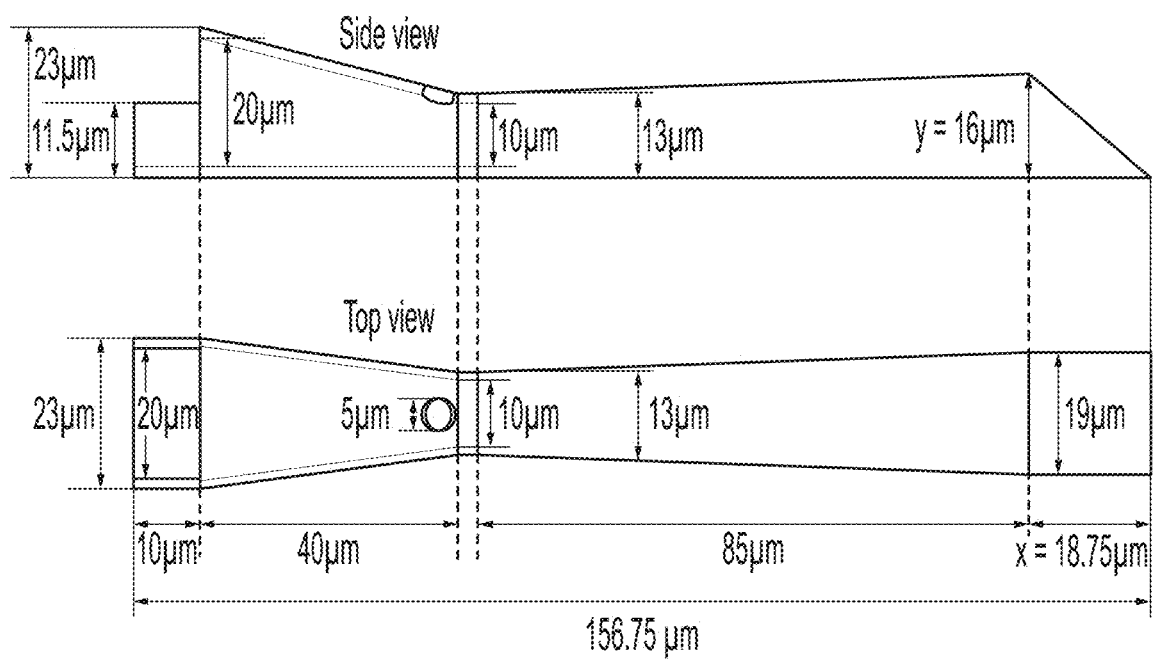
FIG. 9 illustrates a schematic depicting example polymer coupler dimensions.

FIG. 9 is a schematic depicting example polymer coupler dimensions. In FIG. 9 is shown a 3D polymer coupler and height and length dimensions at various portions of the coupler. The dimensions named x and y can define the reflection angle of the TIR mirror. It should be understood that the dimensions shown are example dimensions and other dimensions may be used as appropriate to meet design needs.

The present disclosure is directed to at least the following aspects.

Aspect 1. An optical apparatus comprising, consisting of, or consisting essentially of: a funnel coupler having an orifice configured to receive an optical fiber, wherein the funnel mechanically supports the optical fiber when received in the orifice and guides the optical fiber to a coupling end of the funnel coupler; and a waveguide disposed adjacent the coupling end of the funnel coupler, wherein one or more of the funnel coupler or the waveguide is configured to optically couple the optical fiber and the waveguide when the optical fiber is received in the orifice.

Aspect 2. The optical apparatus of Aspect 1, wherein the funnel coupler has a tapered cross-section along a length thereof.

Aspect 3. The optical apparatus of any one of Aspects 1-2, wherein the orifice of the funnel coupler has a tapered cross-section along a length thereof.

Aspect 4. The optical apparatus of any one of Aspects 1-3, wherein the orifice of the funnel coupler has a first diameter adjacent the coupling end that is smaller than a second diameter at an end opposite the coupling end.

Aspect 5. The optical apparatus of any one of Aspects 1-4, wherein the waveguide is formed from a polymeric material.

Aspect 6. The optical apparatus of any one of Aspects 1-5, wherein the waveguide is tapered along a length thereof.

Aspect 7. The optical apparatus of any one of Aspects 1-6, wherein one or more of the funnel coupler or the waveguide is configured to optically butt couple the optical fiber and the waveguide when the optical fiber is received in the orifice.

Aspect 8. The optical apparatus of any one of Aspects 1-7, wherein the optical fiber is tapered along a length thereof.

Aspect 9. A method of making the optical apparatus of any one of Aspects 1-8.

Aspect 10. A method of using the optical apparatus of any one of Aspects 1-8.

Aspect 11. An optical system comprising, consisting of, or consisting essentially of: a funnel coupler having an orifice configured to receive an optical fiber, wherein the funnel mechanically supports the optical fiber when received in the orifice and guides the optical fiber to a coupling end of the funnel coupler; a first waveguide disposed adjacent the coupling end of the funnel coupler, wherein one or more of the funnel coupler or the first waveguide is configured to optically couple the optical fiber and the first waveguide when the optical fiber is received in the orifice; and a second waveguide disposed adjacent the first waveguide and optically coupled thereto.

Aspect 12. The optical apparatus of Aspect 11, wherein the funnel coupler has a tapered cross-section along a length thereof.

Aspect 13. The optical apparatus of any one of Aspects 11-12, wherein the orifice of the funnel coupler has a tapered cross-section along a length thereof.

Aspect 14. The optical apparatus of any one of Aspects 11-13, wherein the orifice of the funnel coupler has a first diameter adjacent the coupling end that is smaller than a second diameter at an end opposite the coupling end.

Aspect 15. The optical apparatus of any one of Aspects 11-14, wherein the first waveguide is formed from a polymeric material.

Aspect 16. The optical apparatus of any one of Aspects 11-15, wherein the first waveguide is tapered along a length thereof.

Aspect 17. The optical apparatus of any one of Aspects 11-16, wherein one or more of the funnel coupler or the first waveguide is configured to optically butt couple the optical fiber and the first waveguide when the optical fiber is received in the orifice.

Aspect 18. The optical apparatus of any one of Aspects 11-17, wherein the second waveguide is formed from silicon.

Aspect 19. The optical apparatus of any one of Aspects 11-18, wherein the first wave guide is butt coupled to the second waveguide.

Aspect 20. The optical apparatus of any one of Aspects 11-19, wherein the first waveguide is adiabatically coupled to the second waveguide.

Aspect 21. The optical apparatus of any one of Aspects 11-20, wherein the first waveguide is coupled to the second waveguide using a grating coupler.

Aspect 22. The optical apparatus of any one of Aspects 11-21, wherein the optical fiber is tapered along a length thereof.

Aspect 23. A method of making the optical apparatus of any one of Aspects 11-22.

Aspect 24. A method of using the optical apparatus of any one of Aspects 11-22.

Those skilled in the art also will readily appreciate that many additional modifications are possible in the exemplary embodiment without materially departing from the novel teachings and advantages of the invention. Accordingly, any such modifications are intended to be included within the scope of this invention as defined by the following exemplary claims.

What is claimed:

1. An optical apparatus, comprising:
   a funnel coupler having therein a funnel-shaped path configured to receive an optical fiber and guide the optical fiber in a direction along a surface of a photonic chip to a coupling end of the funnel coupler, wherein the funnel coupler mechanically supports the optical fiber when received in the funnel-shaped path, and wherein a cross-section of the funnel-shaped path completely surrounds at least a portion of the optical fiber; and
   a waveguide disposed adjacent the coupling end of the funnel coupler, wherein the waveguide is tapered along a length of the waveguide, and wherein one or more of the funnel coupler or the waveguide is configured to optically couple the optical fiber and the waveguide when the optical fiber is received in the funnel-shaped path.

2. The optical apparatus of claim 1, wherein one or more of the funnel-shaped path or the funnel coupler has a tapered cross-section along a length thereof.

3. The optical apparatus of claim 1, wherein the funnel-shaped path of the funnel coupler has a first diameter adjacent the coupling end that is smaller than a second diameter at an end opposite the coupling end.

4. The optical apparatus of claim 1, wherein the waveguide is formed from a polymeric material.

5. The optical apparatus of claim 1, wherein one or more of the funnel coupler or the waveguide is configured to optically butt couple the optical fiber and the waveguide when the optical fiber is received in the funnel-shaped path.

6. The optical apparatus of claim 1, wherein the optical fiber is tapered along a length thereof.

7. An optical system comprising:
   a funnel coupler having therein a funnel-shaped path configured to receive an optical fiber and guide the optical fiber in a direction along a surface of a photonic chip to a coupling end of the funnel coupler, wherein the funnel coupler mechanically supports the optical fiber when received in the funnel-shaped path, and wherein a cross-section of the funnel-shaped path completely surrounds at least a portion of the optical fiber;
   a first waveguide disposed adjacent the coupling end of the funnel coupler, wherein the first waveguide is tapered along a length of the first waveguide, and wherein one or more of the funnel coupler or the first waveguide is configured to optically couple the optical fiber and the first waveguide when the optical fiber is received in the funnel-shaped path; and
   a second waveguide disposed adjacent the first waveguide and optically coupled thereto, wherein the second waveguide comprises a nanophotonic waveguide.

8. The optical system of claim 7, wherein one or more of the funnel-shaped path or the funnel coupler has a tapered cross-section along a length thereof.

9. The optical system of claim 7, wherein the funnel-shaped path of the funnel coupler has a first diameter adjacent the coupling end that is smaller than a second diameter at an end opposite the coupling end.

10. The optical system of claim 7, wherein the first waveguide is formed from a polymeric material.

11. The optical system of claim 7, wherein one or more of the funnel coupler or the first waveguide is configured to optically butt couple the optical fiber and the first waveguide when the optical fiber is received in the funnel-shaped path.

12. The optical system of claim 7, wherein the second waveguide is formed from silicon.

13. The optical system of claim 7, wherein the first waveguide is butt coupled to the second waveguide.

14. The optical system of claim 7, wherein the first waveguide is adiabatically coupled to the second waveguide.

15. The optical system of claim 7, wherein the first waveguide is coupled to the second waveguide using a grating coupler.

16. The optical system of claim 7, wherein the optical fiber is tapered along a length thereof.

17. The optical system of claim 15, wherein the first waveguide comprises a total internal reflection mirror disposed at an end of the first waveguide adjacent the grating coupler and having an angle configured for couple light in and out of the grating coupler.

18. The optical apparatus of claim 1, wherein the funnel coupler is formed using three-dimensional direct laser writing.

19. An optical apparatus, comprising:
    a funnel coupler having therein a funnel-shaped path configured to receive an optical fiber and guide the optical fiber in a direction along a surface of a photonic chip to a coupling end of the funnel coupler, wherein the funnel coupler mechanically supports the optical fiber when received in the funnel-shaped path, and wherein a cross-section of the funnel-shaped path completely surrounds at least a portion of the optical fiber; and
    a waveguide formed from a polymeric material and disposed adjacent the coupling end of the funnel coupler, wherein one or more of the funnel coupler or the waveguide is configured to optically couple the optical fiber and the waveguide when the optical fiber is received in the funnel-shaped path.

* * * * *